Sept. 11, 1956 J. D. WELCH 2,762,959

AUTOMATIC GAIN CONTROL FOR ELECTRIC SERVO SYSTEMS

Filed Jan. 15, 1954

INVENTOR.

BY JACK D. WELCH

Marvin Moody

ATTORNEY

United States Patent Office 2,762,959

Patented Sept. 11, 1956

2,762,959

AUTOMATIC GAIN CONTROL FOR ELECTRIC SERVO SYSTEMS

Jack D. Welch, Cedar Rapids, Iowa, assignor to Collins Radio Company, Cedar Rapids, Iowa, a corporation of Iowa Application January 15, 1954, Serial No. 404,363

5 Claims. (Cl. 318—30)

This invention relates in general to an automatic gain control and in particular to a circuit which utilizes the variable impedance of a diode to maintain constant gain.

In many computers, electromechanical resolvers are used and are connected in circuit with servo mechanisms for controlling the rotor until a null position is obtained. In some cases, the amplitude of an input signal varies as for example with distance and thus the angular error signal which drives the servo system is not uniform for the same angular positions. This is a disadvantage in that most servomotors respond to amplitude variations of the input voltage and therefore the response of the servo will vary with fluctuations in the input voltage.

It is an object of this invention therefore to provide an automatic gain control circuit wherein fluctuations of the input signal are compensated so that the servo system will receive an input proportional to the angular error.

It is an object of this invention to provide an automatic gain control which compensates for variations in input signal.

Another object of this invention is to utilize the variable impedance characteristic of diodes to control an automatic gain circuit.

A feature of this invention is found in the provision for apparatus which compensates for variations in input signal so that uniform output is obtained for all inputs.

Further objects, features and advantages of this invention will become apparent from the following description and claims when read in view of the drawings, in which:

Figure 1:
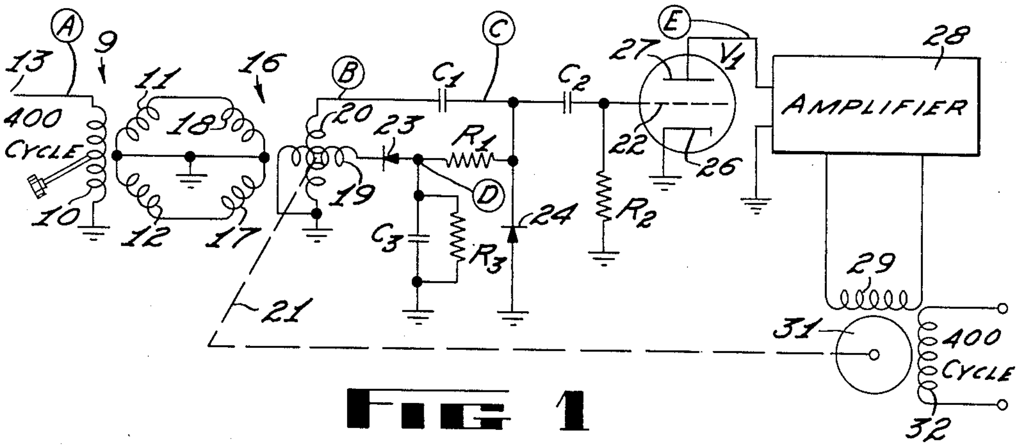
Figure 1 is a schematic diagram of apparatus according to this invention.

Figure 1 illustrates a first electromechanical resolver 9 which might have, for example, a rotor winding 10 and a pair of stator windings 11 and 12. The rotor winding 10 is connected to an input terminal 13, to which a suitable input voltage is connected.

A second electromechanical resolver 16 has a pair of stator windings 17 and 18 that are connected respectively to the windings 11 and 12 and with the common junction point grounded. The rotor of the resolver 16 comprises a pair of windings 19 and 20 which are mounted at right angles to each other and are controlled by the shaft 21.

First ends of the windings 19 and 20 are connected together and to ground. The opposite end of winding 20 is connected to a condenser $C_1$ which has its opposite side connected to a condenser $C_2$. The opposite side of the condenser $C_2$ is connected to the control grid 22 of tube $V_1$.

The other end of the rotor winding 19 is connected to a diode rectifier 23 which might be, for example a germanium diode. A condenser $C_3$ and resistor $R_3$ are connected in parallel. First ends of $C_3$ and $R_3$ are connected to ground and the other ends are connected to the other side of diode 23. A resistor $R_1$ is connected to the other side of diode 23 and to a diode 24, which might be, for example, a germanium diode which has its opposite side connected to ground.

The resistor $R_1$ and diode 24 are connected to the junction point C between the condensers $C_1$ and $C_2$.

A resistor $R_2$ is connected between grid 22 and ground. The cathode 26 of tube $V_1$ may be connected to ground and the plate 27 is connected to servo amplifier 28.

The servo amplifier 28 furnishes an output to the motor winding 29 of motor 31. Another winding 32 is connected to a suitable alternating power supply as for example 400 cycles A. C.

The shaft 21 is the output shaft of the motor. The motor 31 may be a two phase motor. The speed of such motors varies with amplitude of the voltage supplied to the winding 29. The direction of rotation is controlled by the phase of the input to winding 29.

In operation, let it be assumed that an output which is proportional to distance is connected to terminal 13. Suppose for example that the apparatus is being used in a navigational computer wherein radiant energy is received on an air craft with the amplitude being inversely proportional to the distance to the station. The amplitude of the constant frequency 400 cycles input to terminal 13 would vary from some zero value corresponding to a great distance, to maximum corresponding to a point directly above the transmitter.

Suppose further that it is desired to obtain a bearing to the transmitter for directional indication. If it is to be assumed that the voltage across winding 10 is A, then the output voltage across winding 11 will be $A \sin \theta_1$, where $\theta_1$ is the angular position of the rotor 10. The output across the stator winding 12 will be $A \cos \theta_1$.

These signals will be applied to the stator windings 17 and 18 of resolver 16. It is desired to position the rotor of the resolver 16 by shaft 21 of motor 31 until the winding 20 is at a null position. Since windings 19 and 20 are mounted at right angles to each other, when the winding 20 is at the null position the voltage across winding 19 will be at a maximum.

The diode 24 acts as a variable impedance wherein the value of the impedance is controlled by the current through it. The current through the diode 24 is controlled in a manner to be later described.

The condenser $C_1$ and diode 24 form a voltage divider with the error signal applied across it. In other words, if the winding 20 is not at the null position (which is the desired one) there will be a voltage induced in the winding 20 which will appear from point B to ground.

The amplitude of this signal will be determined by two factors. One is the angular error position of the shaft 21 from null which varies as a sine function. The other is the amplitude of the input signal applied to terminal 13. In other words, with a fixed angular error of shaft 21 the voltage appearing at point B will change with variations in amplitude of the signal applied to terminal 13.

The point C between the condenser $C_1$ and the diode 24 is coupled through the condenser $C_2$ to the grid 22 of tube $V_1$. The circuit of the invention provides means for reducing the A. C. signal applied to the grid when the amplitude applied to the input terminal is high, and which operates to produce a lesser attenuation for low voltage error signals, thus operating to maintain the alternating current voltage at point B substantially constant for considerable variation in supply voltage.

To accomplish this result, advantage is taken of the fact that the impedance of a diode in the forward direction varies inversely as the current through it. In other words, if a large amount of current is passing through a diode rectifier the impedance will be low whereas if a small current is passing through it, the impedance will be high.

The diode 23 accomplishes half-wave rectification of the voltage induced in winding 19. Resistor $R_1$ in combination with the condenser $C_3$ act as a filter for converting this signal to a direct current which is positive at point C.

The D. C. voltage appearing at point C derived from rectification of the output of winding 19 will vary with the amplitude of the input signal applied to terminal 13. This is true because as the amplitude of the input signal is increased, the induced voltages in the various stator and rotor windings will be proportionately increased. As this voltage increases, the current through the diode 23 increases which reduces the impedance of the diode 24.

Since condenser $C_1$ and diode 24 form a voltage divider, the amplitude of the signal from winding 20 coupled to the grid of tube $V_1$ will be decreased as the voltage at point C becomes more positive. Condenser $C_2$ allows only alternating signals to pass.

Figure 2:
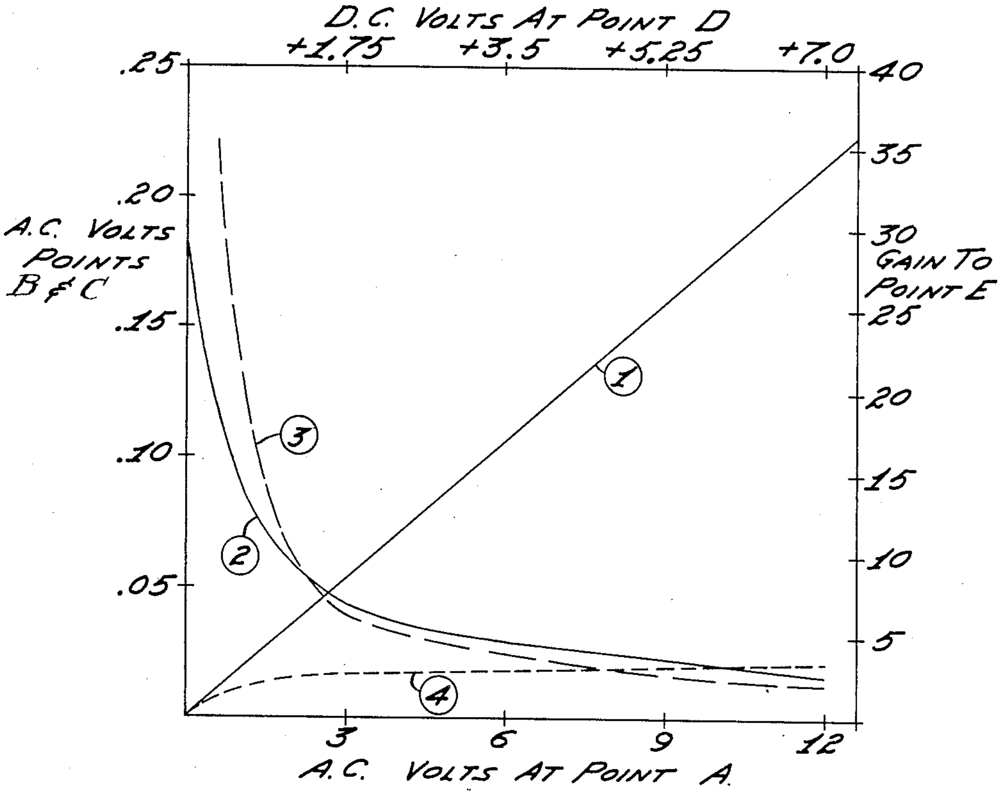
Figure 2 is a plot of various curves relating to characteristics of the circuit shown in Figure 1.

Figure 2 illustrates the induced A. C. voltage appearing at point B as a function of the input alternating voltage at point A (input terminal 13) assuming that a fixed angular error is maintained (curve 1). Curve 2 illustrates the gain to the input of the amplifier plotted as a function of variation of input voltage. This curve is obtained by measuring voltages in a working model.

Curve 3 illustrates the ideal gain necessary to obtain a fixed voltage at the input to the amplifier 28. Suppose for example that it is desired to maintain 4.5 volts input to the amplifier independent of variations at terminal 13. This would result in a parabolic curve as illustrated.

The A. C. voltage at point C is plotted as curve 4 against the A. C. voltage at point A. It is to be noted that if the A. C. voltage increases at point A very little change occurs at point C. This is because the increased current through the diode 24 reduces the impedance through the diode which in turn reduces the percentage of the A. C. signal coupled to the grid of the tube $V_1$.

It is seen that its invention utilizes the impedance versus current characteristic of a conducting rectifier connected in a voltage divider circuit to stabilize the amplitude of a control voltage. It also allows a constant output to be obtained from a resolver when the rotor is positioned a small distance from null and the input to the resolver is a variable function.

Although this invention has been described with respect to particular embodiments thereof, it is not to be so limited as changes and modifications may be made therein which are within the full intended scope of the invention, as defined by the appended claims.

I claim:

1. An automatic gain control comprising, a first resolver having stator and rotor windings, the rotor winding of said first resolver connected to an input voltage, a second resolver with stator and rotor windings, a pair of stator windings of the first resolver connected to a pair of stator windings of the second resolver, a control shaft connected to the rotor windings of the second resolver, said second resolver having a pair of rotor windings mounted at right angles to each other, a first rectifier connected to the first rotor winding of the second resolver, a pair of condensers connected in series with the second rotor winding of the second resolver, an electron tube with its control grid connected to the second of said pair of condensers, a second rectifier connected to said first rectifier and to the junction point between said pair of condensers, an alternating current motor with one of its field windings connected to the output of said electron tube, and said motor connected to said control shaft.

2. Apparatus for positioning a control shaft comprising, a resolver having a pair of stator windings and a pair of rotor windings with the rotor windings mounted at right angles to each other, said control shaft connected to the rotor, a driving means attached to said control shaft, positioning signals supplied to the stator windings of said resolver, an electron tube, the output of said electron tube coupled to said driving means, a pair of condensers in series between the first rotor winding of said resolver and the control grid of said electron tube, a first diode detector connected between ground and the junction point between the pair of condensers, a first resistor, a second diode rectifier connected in series with the first resistor between the junction point between said condensers and the second rotor winding, a second resistor and a third condenser in parallel with the second resistor and the parallel combination connected between ground and the junction point between the second rectifier and the first resistor.

3. An automatic gain control circuit comprising, a resolver with a pair of stator windings and a first and second rotor winding mounted at right angles to each other, positioning signals supplied to the stator windings of said resolver, a control shaft attached to the rotor of said resolver, driving means connected to said control shaft, a pair of control windings on said driving means, an alternating power supply connected to one of said control windings, an amplifier connected to the other control winding, an electron tube with its output connected to said amplifier, a pair of condensers connected between the first rotor winding and the control grid of the electron tube, a first diode rectifier connected between the junction point between the pair of condensers and ground, a second diode rectifier, a first resistor connected in series with said second diode rectifier and the combination connected between the junction point of said pair of condensers and the second rotor winding of the resolver, and a third condenser connected between ground and the junction point between the first resistor and the second diode rectifier.

4. An automatic gain control circuit comprising, a first resolver with a first and second stator winding and a pair of rotor windings mounted at right angles to each other, a control shaft attached to the rotor of said first resolver, driving means connected to said control shaft, a pair of control windings on said driving means, an alternating power supply connected to one of said control windings, an amplifier connected to the other control winding, an electron tube with its output connected to said amplifier, a pair of condensers connected between the first rotor winding of the first resolver and the control grid of the electron tube, a first diode rectifier connected between the junction point between the pair of condensers and ground, a second diode rectifier, a first resistor connected in series with said second diode rectifier and the combination connected between the junction point of said pair of condensers and the second rotor winding of the first resolver, a third condenser connected between ground and the junction point between the first resistor and the second diode rectifier, and a second resolver with a rotor winding connected to an input signal and a pair of stator windings connected to the stator windings of the first resolver.

5. An automatic gain control circuit comprising, a resolver with a pair of stator windings and a first and second rotor winding mounted at right angles to each other, positioning signals supplied to the stator windings of said resolver, a control shaft attached to the rotor of said resolver, driving means connected to said control shaft, a pair of control windings on said driving means, an alternating power supply connected to one of said control windings, an amplifier connected to the other control winding, an electron tube with its output connected to said amplifier, a pair of condensers connected between the first rotor winding and the control grid of the electron tube, a first diode rectifier connected between the junction point between the pair of condensers and ground, a second diode rectifier, a first resistor connected in series with said second diode rectifier and the combination connected between the junction point of said pair of condensers and the second rotor winding of the resolver, a third condenser connected between ground and the junction point between the first resistor and the second diode rectifier, and a second resistor connected between ground and the control grid of the electron tube.

References Cited in the file of this patent

UNITED STATES PATENTS

| | | |
|---|---|---|
| 1,850,587 | Joffe | Mar. 22, 1932 |
| 2,086,910 | Hansell | July 13, 1937 |
| 2,310,066 | Currier | Feb. 2, 1943 |
| 2,572,044 | McCarthy et al. | Oct. 23, 1951 |
| 2,713,143 | Bock | July 12, 1955 |

OTHER REFERENCES

"Electronic Instruments," Greenwood, Holdam, MacRae; McGraw-Hill, 1948, pp. 476–477.